United States Patent [19]

Blaha

[11] Patent Number: 5,370,464
[45] Date of Patent: Dec. 6, 1994

[54] ADJUSTABLE BEARING SUPPORT ASSEMBLY

[75] Inventor: Daniel L. Blaha, Westmont, Ill.

[73] Assignee: CPC International Inc., Englewood Cliffs, N.J.

[21] Appl. No.: 61,467

[22] Filed: May 17, 1993

[51] Int. Cl.⁵ .............................................. F16C 23/02
[52] U.S. Cl. .................................... 384/252; 384/260
[58] Field of Search ........ 384/247, 252, 253, 257–260, 384/428, 442–444

[56] References Cited

U.S. PATENT DOCUMENTS

| | | | |
|---|---|---|---|
| 362,291 | 5/1887 | Mackay | 384/259 |
| 482,287 | 9/1892 | Wagner | 384/259 |
| 589,137 | 8/1897 | Muller | 384/259 |
| 593,742 | 11/1897 | Dill | 384/258 |
| 1,032,244 | 7/1912 | Ryder | 384/259 |
| 1,052,837 | 2/1913 | Makutchan | 384/258 |
| 1,114,022 | 10/1914 | Olbrantz et al. | 384/260 |
| 1,740,836 | 12/1929 | Robison | 384/260 |
| 3,037,613 | 6/1962 | Harmon | 198/213 |
| 3,292,585 | 12/1964 | Buschbom et al. | 119/52 |
| 3,504,954 | 4/1970 | Robson | 384/252 |
| 4,217,980 | 8/1980 | Kemp | 198/666 |
| 4,384,643 | 5/1983 | Cone | 384/258 X |

*Primary Examiner*—Thomas R. Hannon
*Attorney, Agent, or Firm*—Brooks Haidt Haffner & Delahunty

[57] ABSTRACT

A bearing support assembly is disclosed having a support plate with support holes and a column mounting plate with slot openings centered and positionally adjustable in a first direction over the support holes. A mounting plate having mounting slots is perpendicularly affixed at one side of the support plate by mounting bolts which are positionally adjustable in a second direction within the mounting slots. A tubular support column is affixed at one end to the column mounting plate, the interior of the tubular support column containing: a screw adjusting block which is fixedly secured within the tubular support column at the one end, and a slidably engaging support post, one end of which is connected to a bearing clamp, which in turn supports a bearing. An adjustment bolt engages the screw adjusting block and the other end of the support post, where the adjustment bolt is rotationally adjustable in a third direction to vary the vertical position of the bearing support assembly.

31 Claims, 4 Drawing Sheets

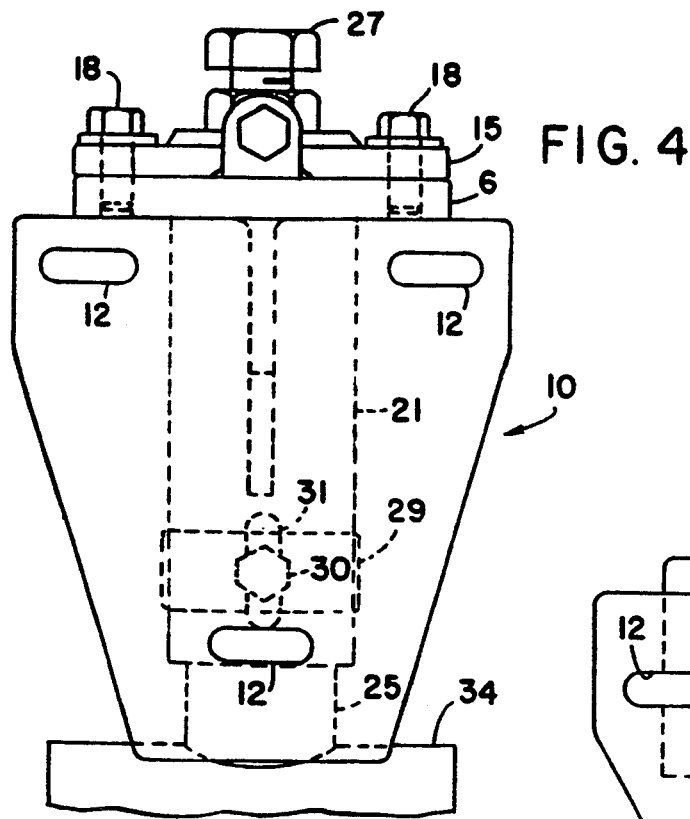
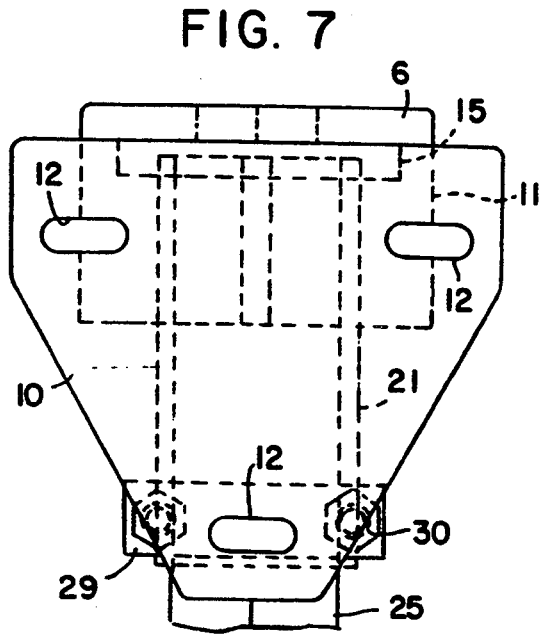
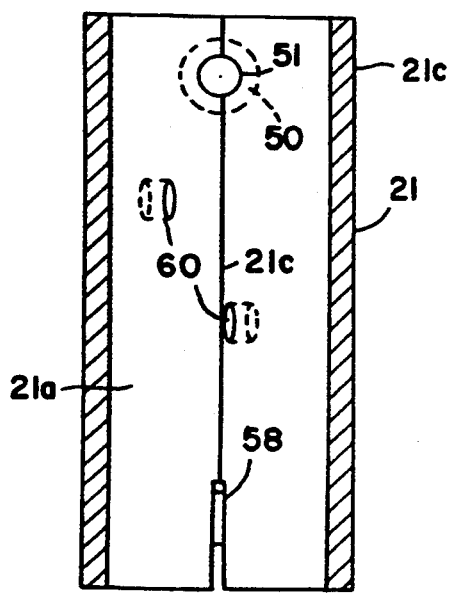
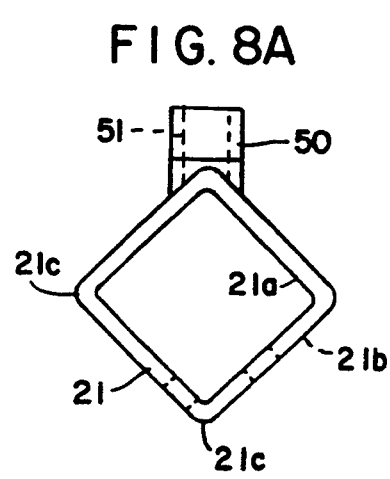

ADJUSTABLE BEARING SUPPORT ASSEMBLY

BACKGROUND OF THE INVENTION

1. Field of the Invention

The present invention relates generally to bearing support assemblies allowing simpler adjustment and alignment of the bearing support components and bearing supported therein along three dimensions, and more particularly to an improved bearing support assembly configuration for auger screw conveyor applications.

2. Description of the Related Art

Auger screw conveyor systems for movement of granular materials, such as sugar, typically include a series of lengthy and conjoined auger sections mounted on a common drive shaft and surrounded by a trough. Since the drive shaft can be hundreds of feet in length with the length of each auger section 12 feet or more, it is necessary to support the drive shaft at intervals between the auger sections to prevent bending of the shaft and augers. Supports are usually attached to bearings which surround the drive shaft at said intervals.

Proper alignment of the many conjoined auger sections within a trough is crucial since misalignment between auger sections can cause the auger vanes or blades to contact the sides of the trough, depositing abraded metal shavings or other foreign matter within the conveyed product. Misalignment can be caused by a number of factors, including improper connection of auger sections, and sagging bearing supports.

Further, even properly aligned auger sections require both time-consuming and costly maintenance to keep them so. Existing systems typically require that each misaligned bearing support assembly along a conveyance line be dismantled to realign the auger sections within a trough, reducing overall productivity significantly since the entire production line is usually shut down during realignment maintenance procedures. Misalignment further results in reduced component life due to wear and abrasion, unsafe work conditions, and products contaminated by the worn components.

In view of the aforementioned problems and difficulties in the art, it is an object of the present invention to provide a bearing support assembly to reduce or eliminate foreign material contamination in the conveyed product due to misaligned auger screw conveyor components.

It is another object of the present invention to provide for simpler and quicker maintenance, repair and replacement of conveyor components, particularly realignment, which does not require line shutdown.

It is a further object of the invention to increase the component life by decreasing wear due to misalignment, thereby creating a more productive and safer work environment.

SUMMARY OF THE INVENTION

In accordance with the preferred embodiments of the invention, a bearing support assembly includes a support plate having support holes slidably engaged with a column mounting plate having slot openings centered and positionally adjustable in a first direction over the support holes and secured by bolts. A mounting plate having mounting slots is perpendicularly affixed to one side of the support plate, where mounting bolts are positionally adjustable in a second direction within the mounting slots. A tubular support column is affixed at one end to the column mounting plate, the interior of the tubular support column including a screw adjusting block which is fixedly secured within said support column at the one end, and including a support post in slidable engagement within the interior of the support column. One end of the support post within the column is connected to a bearing clamp which in turn supports a bearing and an auger section. An adjustment bolt engages the screw adjusting block through openings in both the support and column mounting plates. The adjustment bolt further engages the other end of the support post, the vertical position of which is changed by turning the adjustment bolt, allowing adjustment in a third direction. Adjusting the above configuration allows simpler adjustment and alignment of the bearing support assembly in three dimensions.

BRIEF DESCRIPTION OF THE DRAWINGS

The invention will be better understood after reading the following detailed description of the preferred embodiments with reference to the appended drawings in which:

FIG. 4 is a left end elevation view of the left mounting plate shown in FIGS. 2 and 3;

FIG. 7 is a left end elevation view of the left mounting plate shown in FIGS. 5 and 6; and FIGS. 8A and 8B are top and side elevation views of the tubular support column shown in FIGS. 5 and 6.

The same reference numbers are used throughout the drawings to designate the same or similar parts.

DETAILED DESCRIPTION OF THE PREFERRED EMBODIMENTS

Figure 1:
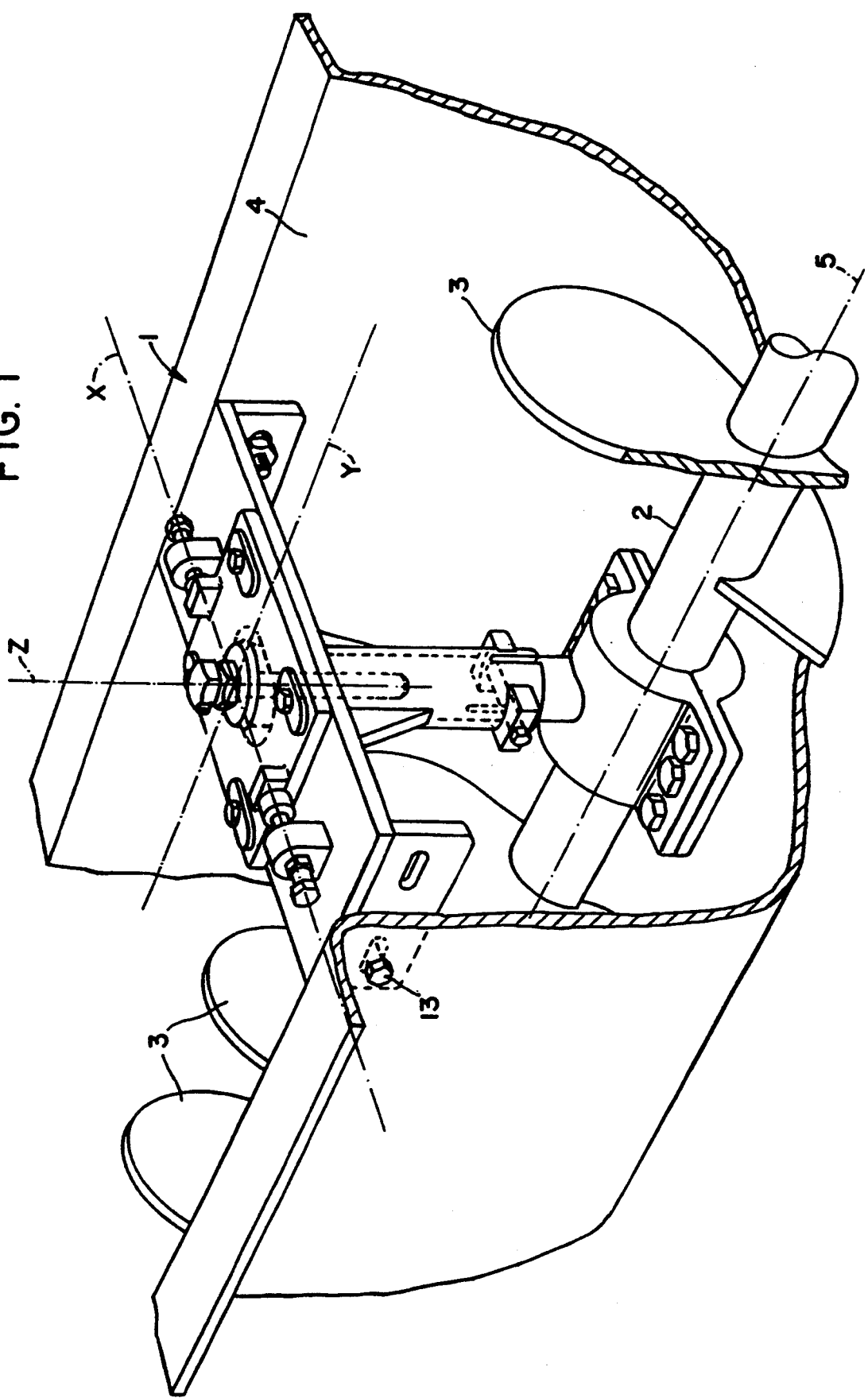
FIG. 1 is a side elevation view of an adjustable bearing support assembly of the present invention supporting an auger section within a trough.

Referring to the drawings, there is shown in FIGS. 1–4 a preferred embodiment of an adjustable bearing support assembly 1 of the present invention, allowing positional adjustment of said support assembly 1 along X, Y and Z axes. Support assembly 1, as shown in FIG. 1, is attached to and supports an auger section 2 driven by a drive shaft (not shown). Auger section 2 preferably has a helical vane 3 formed thereon which extends spirally along most of the length of said auger section 2, where said bearing support assembly 1 grips a non-vaned portion of said auger section 2. Support assembly 1 may also conjoin the ends of two auger sections 2, or may grip a drive or gudgeon shaft between two auger sections 2, at the end of an auger section 2, or anywhere else along the drive shaft. Helical vane 3 of said auger section 2 when rotated within a trough 4 feeds granular or otherwise loose particles, such as dextrose or sugar, lengthwise through said trough 4 along an axis 5.

Figure 2:
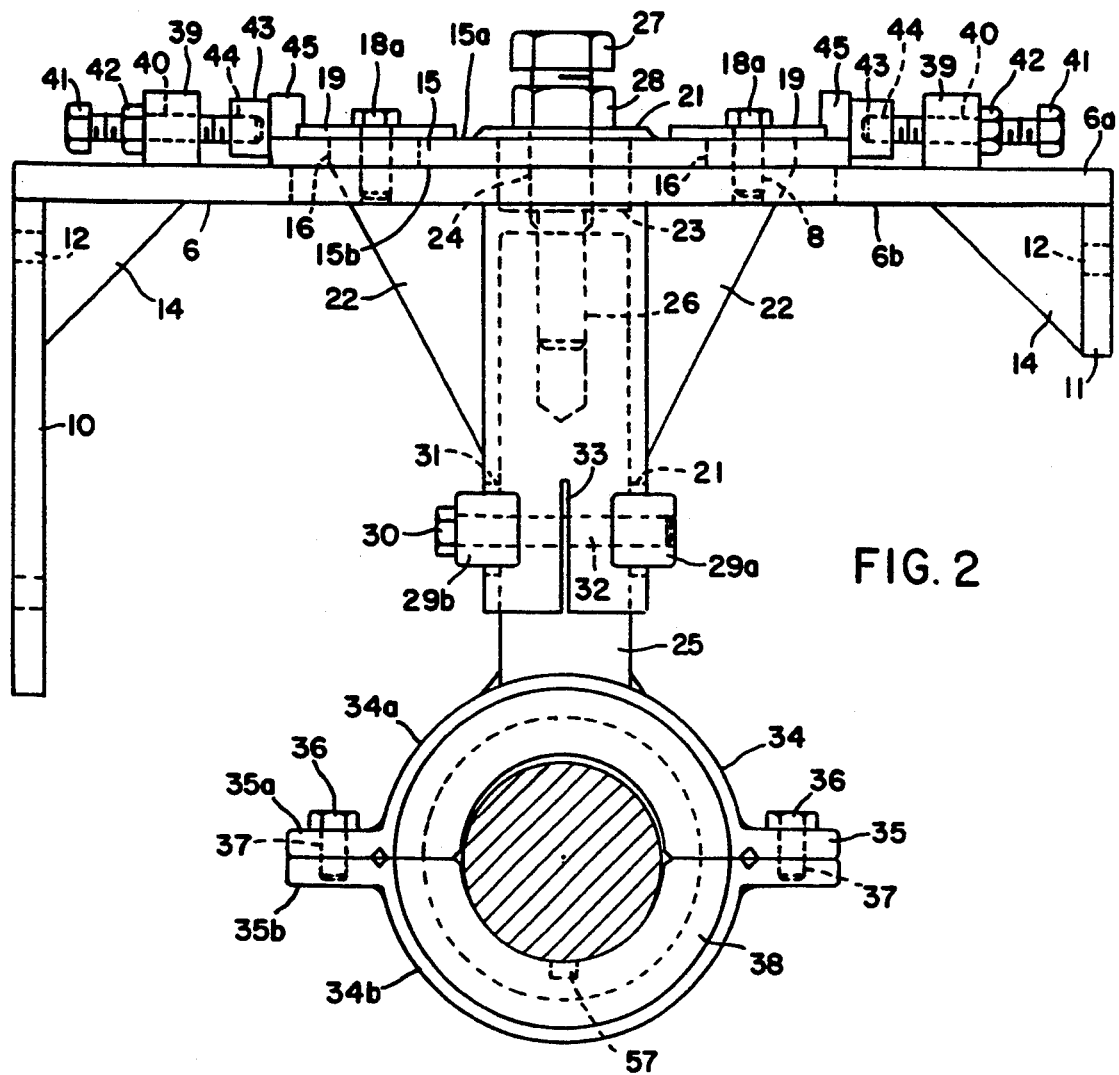
FIG. 2 is a side elevational view, partly in section, of the embodiment shown in FIG. 3.
Figure 3:
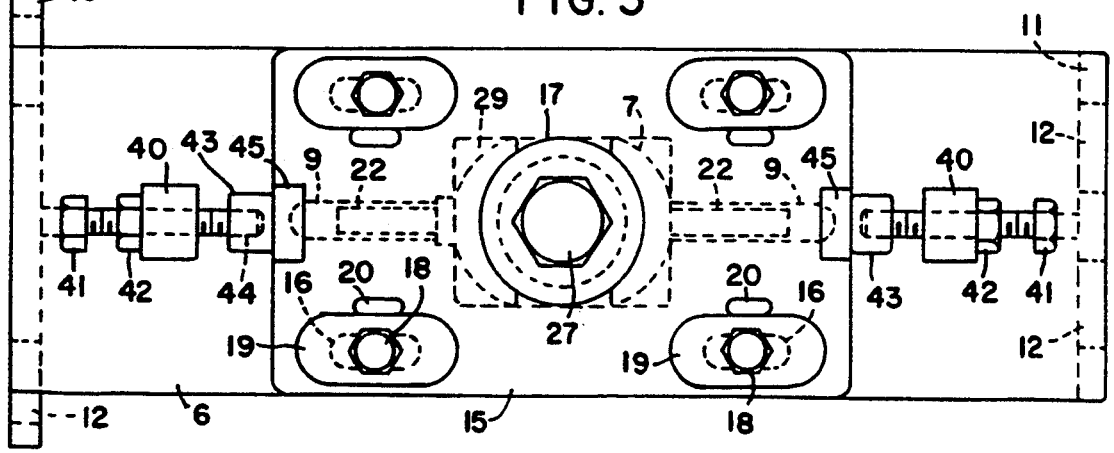
FIG. 3 is a top view of a first and preferred embodiment of the adjustable bearing support assembly of the present invention.

As more particularly shown in FIGS. 2–4, support assembly 1 of the present invention includes a support plate 6 having an opening 7, preferably oval-shaped, and a plurality of threaded mounting holes 8. Support plate 6 has an upper surface 6a and a lower surface 6b. Oval-shaped opening 7 preferably has two gusset slots 9 extending from opposite sides of said opening 7 for receiving inner gussets 22 described below and as shown in FIGS. 2 and 3.

A left mounting plate 10, as shown in FIG. 4, is attached at one end of said support plate 6, preferably welded thereto. A right mounting plate 11 may be similarly attached to an opposite end of said support plate 6 if added support is necessary. Both mounting plates 10 and 11 preferably have a plurality of slots 12, as shown in FIG. 4, for receiving a corresponding plurality of anchoring bolts 13 (shown in FIG. 1) for engagement with an external support (not shown) or with one or both sides of said trough 4. It should be understood that circumstances may require only a right mounting plate 11 and no left mounting plate 10 or vice versa. A pair of outer gussets 14, as shown in FIG. 2, provide brace support between said support plate 6 and the mounting plates 10 and 11, and are preferably welded in place.

A column mounting plate 15 has an upper 15a and a lower 15b surface, where said lower surface 15b slidably engages said upper surface 6a of said support plate 6. Said column mounting plate 15 further includes a plurality of column plate slots 16, each of which is preferably situated over said plurality of said threaded mounting holes 8 of said support plate 6. Plate 15 also includes an opening 17, which is preferably circular and which is initially situated centrally over said oval-shaped opening 7 of said support plate 6.

A plurality of plate bolts 18 secure the slidably engageable plates 6 and 15 together, where head portions 18a of each plate bolt 18 extends above the upper surface 15a of said column mounting plate 15. Said plurality of plate bolts 18 preferably also pass through a corresponding plurality of clamp washers 19, each of which preferably rests above said plurality of column plate slots 16 of said column mounting plate 15. Each of said clamp washers 19 preferably has a sufficient size and shape to completely cover said column plate slot 16. Each plate bolt 18 thus preferably passes through said clamp washer 19 and said column mounting plate 15 through said column plate slot 16, and is threaded into the threaded mounting hole 8 of said support plate 6.

Preferably, situated alongside said plurality of said clamp washers 19 are a corresponding plurality of antirotation blocks 20, shown in FIG. 3, each of said antirotation blocks 20 is preferably in a tight fit therewith to prevent any rotational movement of said clamp washers 19 atop said column plate 15. Also, said plate bolts 18 preferably have a diameter substantially equal to but slightly less than the width of said column plate slot 16 to form a close, slidable fit of said plate bolt 18 in said column plate slot 16. Said close fit reduces any non-longitudinal movement of said clamp washers 19 and column plate 15 in a direction away from the longitudinal direction of the slots 16.

Passing through both the oval-shaped opening 7 of said support plate 6 and said circular opening 17 of said column mounting plate 15 is a tubular support column 21, preferably circular. As shown in FIG. 2, one end of said tubular support column 21 preferably extends above said upper surface 15a of said plate 15 a sufficient distance, preferably approximately one quarter inch, so that said tubular support column 21 may be welded in place to said upper surface 15a of said plate 15. Tubular support column 21 has an inner surface 21a and an outer surface 21b. Inner gussets 22, shown in FIGS. 2 and 3, fit within the gusset slots 9 on said opposite sides of said oval-shaped opening 7 in said support plate 6, and said inner gussets 22 are preferably welded in place along the curved side of tubular support column 21 well as the lower surface 15b of said column mounting plate 15. Inner gussets 22 support and maintain the substantially vertical position of said tubular support column 21 against said plates 6 and 15.

Within said preferably circular tubular support column 21 at a first end thereof is a screw adjusting block 23, also preferably circular, one end of which preferably extends above upper surface 15a of said column mounting plate 15 a sufficient distance to also allow welding along said one end, e.g., approximately one quarter inch or the same extension height as said tubular support column 21 above said column mounting plate 15. Screw adjusting block 23 also preferably forms a tight press fit along the inner surface 21a of said tubular support column 21 at said first end thereof. Preferably, block 23 also has a right hand threaded hole 24 centered along the central axis formed by said circular tubular support column 21.

Also within said circular tubular support column 21 is a circular support post 25 in slidable and telescoping contact therewith along the portion of inner surface 21a below said screw adjusting block 23, where said block 23 is secured at said first end of said tubular support column 21. Support post 25 preferably also has a left hand threaded hole 26 at a first end thereof which is also centered along the central axis of said support column 21, where said first end of said support post 25 faces said block 23. A vertical adjustment bolt 27 preferably engages the right hand thread of hole 24 and the left hand thread of hole 26 of both the screw adjusting block 23 and the support post 25, respectively, and said bolt 27 is preferably locked into place by a lock nut 28 atop said block 23.

Support post 25 is also secured in place within said tubular column support 21 by means of a split column clamp 29 affixed to the outer surface 21b of said tubular support column 21 at a second and opposite end thereof. Two halves 29a and 29b of said split column clamp 29 are preferably secured along said second end of said tubular support column 21 by a split column bolt 30, which preferably passes through a pair of opposing vertical slots 31 (as also shown in FIG. 4) in said tubular support column 21 and also through a post hole 32 in said support post 25, where said vertical slots 31 are preferably initially aligned centrally about said post hole 32. Tightening said split column bolt 30 draws the two halves 29a and 29b of the split column clamp 29 together, compressing the sides of said tubular support column 21 against the support post 25, which preferably already forms a tight but slidable press fit within said tubular support column 21. To facilitate compression, a pair of opposing narrow column slots 33 also at the second and opposite end of said tubular support column 21 are preferably also equally spaced between said vertical slots 31, where said column slots 33 preferably assist said split column clamp 29 to form a tight fit, thereby firmly holding the position of said support post 25 within said tubular support column 21.

The second and opposite end of said support post 22 is preferably attached to a circular split bearing insert clamp 34, preferably by welding. Said opposite end of said support post 25 preferably has a curved shape corresponding approximately to the outer radius of said clamp 34 to facilitate the welding of said support post 25 to said clamp 34. Split bearing insert clamp 34 preferably includes top 34a and bottom 34b halves, each having a pair of opposing upper 35a and lower 35b bearing insert clamp flanges 35 affixed thereto, as shown in FIG. 3, and held together by means of a plurality of clamp bolts 36 through corresponding threaded clamp holes 37 in said flanges 35. Flanges 35 are preferably affixed on opposite sides of said bearing insert clamp 34, preferably at substantially right angles to the central axis formed by said tubular support column 21 and said support post 25. Preferably, the clamp holes 37 in said upper flange 35a are entirely threaded, whereas the clamp holes 37 in said lower flange 35b need not extend entirely through said lower flange 35b but are preferably threaded to a sufficient length to fixedly engage the driven ends of said clamp bolts 36. Both halves of the clamp 34 as well as both halves of the flanges 35 are preferably welded together.

Held within said bearing insert clamp 34 is a bearing 38, preferably made of an inert, durable, wear-resistant and non-metallic material. The material of choice to one skilled in the art will vary depending upon the specific application, and is dependent upon the shaft material and the product conveyed. One example of a preferred material of the present invention is melamine. Bearing 38 holds an auger section 2 or drive shaft (not shown), as illustrated in FIGS. 1 and 2.

As shown in FIGS. 2 and 3, a pair of square or rectangular adjusting blocks 39 preferably rest upon said support plate 6 of the first embodiment on either side of said column mounting plate 15, and are preferably welded in place. Each of said adjusting blocks 39 preferably has a threaded hole 40 for engaging the threads of an adjusting bolt 41, each of which is preferably locked in place within said adjusting block 39 by means of a lock nut 42 abutting one face of said block 39. Said adjusting bolts 41 preferably also engage a bolt clamping pad 43, preferably circular, by engaging the internal threads of a bolt hole 44 within said bolt clamping pad 43. Bolt hole 44 preferably does not extend entirely through said pad 43, and said adjusting bolt 41 engages said bolt hole 44 through a first face of said circular pad 43, thereby leaving a second and opposite circular face smooth. Said opposite face of said pad 43 preferably abuts against both a plate clamping pad 45 and an edge of said column mounting plate 15. Said plate clamping pad 45 is preferably welded to said column mounting plate 15 along said edge thereof. Tightening said adjusting bolts 41 on either side of said column mounting plate 15 presses the smooth faces of said bolt clamping pads 43 against the surfaces of the plate clamping pads 45 and plate 15, further preventing any longitudinal movement of said column mounting plate 15 in relation to said support plate 6.

As discussed in the background and objects of the invention sections above, one of the primary advantages of the present invention is that simple non-dismantling adjustments to the bearing support assembly 1 provide three discrete axes of movement by which to align said auger section 2 within said trough 4.

Vertical or Z-axis adjustment to the height of said auger section 2 is done through vertical adjustment bolt 27. As described above and shown in FIGS. 1 and 2, rotation of said bolt 27 in threaded engagement with said threaded hole 26 raises or lowers support post 25 slidably engaged within said tubular support column 21 when said split column clamp 29 is loosened. Since the opposite end of said support post 25 is attached to said split bearing insert clamp 34, simple manipulation of said vertical adjustment bolt 27 also moves the bearing 38 and auger section 2 therein, allowing vertical or Z-axis adjustment of said auger section 2 within said trough 4 along the Z-axis shown in FIG. 1, the first of the three axes. Upon completion of vertical adjustment, said split column clamp 29 is preferably retightened, thereby securing the new position of said support post 25 within said support column 21. The vertical slots 31 along the side of tubular support column 21 which receive said split column bolt 30 preferably have sufficient length to maximize the range of adjustment of said bolt 30 within said slots 31, thereby maximizing the range of vertical adjustment of said bearing support assembly 1.

As shown by FIGS. 1-3, longitudinal or X-axis adjustment of said bearing support assembly 1 and said auger section 2 within said trough 4 is done by loosening said threaded plate bolts 18 within the column plate slots 16 of said column mounting plate 15, loosening said adjusting bolts 41 on said support plate 6, and slidably repositioning said column mounting plate 15 relative to said support plate 6. More particularly, the loosened plate bolts 18 through said mounting holes 8 are longitudinally repositioned within the column plate slots 16. Since said tubular support column 21 is affixed to said column mounting plate 15, slidable adjustment of said plate 15 also results in a corresponding longitudinal slidable adjustment of said tubular support column 21, support post 25, bearing insert clamp 34, bearing 38 and said auger screw 2 within said trough 4 along the X-axis shown in FIG. 1, the second of the three axes. When said column mounting plate 15 has been longitudinally repositioned along the X-axis relative to said support plate 6, both threaded bolts 18 and adjusting bolts 41 are retightened, maintaining the longitudinally adjusted position of said plate 15 and also auger screw 2. Preferably, oval-shaped opening 7 in said support plate 6 has a sufficient longitudinal length to maximize the range of repositioning of said circular opening 17 in column plate 15 along the oval-shaped opening 7, thereby maximizing the range of longitudinal adjustment of said bearing support assembly 1.

A third or Y-axis adjustment of said bearing support assembly 1 within said trough 4 is done by loosening said anchoring bolts 13, as shown in FIG. 1, securing said left 10 and/or right 11 mounting plates to external supports, such as the sides of trough 4 in FIG. 1 or a wall surface (not shown), and slidably repositioning said bearing support assembly 1 relative to said trough 4 along the direction of said mounting plate slots 12. When said support assembly 1 has been so repositioned, the anchoring bolts 13 are retightened, securing the new position. Preferably, said mounting plate slots 12 have a sufficient length to maximize the range of repositioning of said bolts 13 in said slots 12, thereby allowing adjustment and alignment of said bearing support assembly 1 and said auger screw 2 within a trough 4 along the Z-axis shown in FIG. 1, the third axis.

Referring again to the drawings, there is shown in FIGS. 5-8 a second preferred embodiment of the present invention. Support assembly 1 of this embodiment also includes a top support plate 6 having a preferably oval-shaped opening 7 and a plurality of threaded mounting holes 8. Left 10 and right 11 mounting plates are similarly attached to said top support plate 6, where both mounting plates also have a plurality of mounting plate slots 12, as shown in FIG. 7, for receiving anchoring bolts 13 (not shown). Outer gussets 14 provide similar brace support between top support plate 6 and mounting plates 10 and 11.

However, whereas the column mounting plate 15 is preferably secured atop said support plate 6 in the first embodiment, plate 15 in the second embodiment is preferably affixed to the lower surface 6b of said top support plate 6. More particularly, upper surface 15a of said column mounting plate 15 is secured along the lower surface 6b of said top support plate 6 by said plurality of threaded plate bolts 18. Each plate bolt 18 thus preferably passes through one of said clamp washers 19 covering each of said column plate slots 16 and said column mounting plate 15 through said column plate slot 16, each of which is preferably aligned underneath said threaded mounting holes 8 of top support plate 6, and engages the thread of one of said threaded mounting holes 8. Preferably, column plate slots 16 form a close fit with the shaft of said plate bolts 18. Unlike the plate bolts 18 in the first embodiment, the head portions 18a of the plate bolts 18 in the second embodiment are on the underside of the conjoined plates 6 and 15.

Column mounting plate 15 in this second embodiment also has an opening 17 therethrough. However, said opening 17 is preferably square or diamond-shaped and not circular. Nonetheless, it should be understood that a circular opening 17 and circular tubular support column 21, as in the first embodiment, may be employed in the second, and vice versa. Square or diamond-shaped opening 17 in this second embodiment preferably has a countersunk portion 46 on said lower surface 15b of said column mounting plate 15.

Square opening 17 is also preferably rotated 45 degrees in relation to the X or Y axes, as illustrated in FIG. 1, thereby forming a diamond shape. Further, said opening 17 in said column mounting plate 15 is initially and preferably centrally aligned under said oval-shaped opening 7 in said top support plate 6. Lower surface 15b of said column mounting plate 15 preferably has an arcuate groove 47 along one end thereof. Preferably, said plate bolts 18 have a length sufficient to provide secure threaded engagement within said mounting hole 8, but do not extend through said top support plate 6 to upper surface 6a, thereby keeping upper surface 6a of said top support plate 6 flat. It should nonetheless be understood that plate bolts 18 may extend entirely through said threaded mounting hole 8 and engage a nut (not shown) along upper surface 6a of said top support plate 6.

Figure 5:
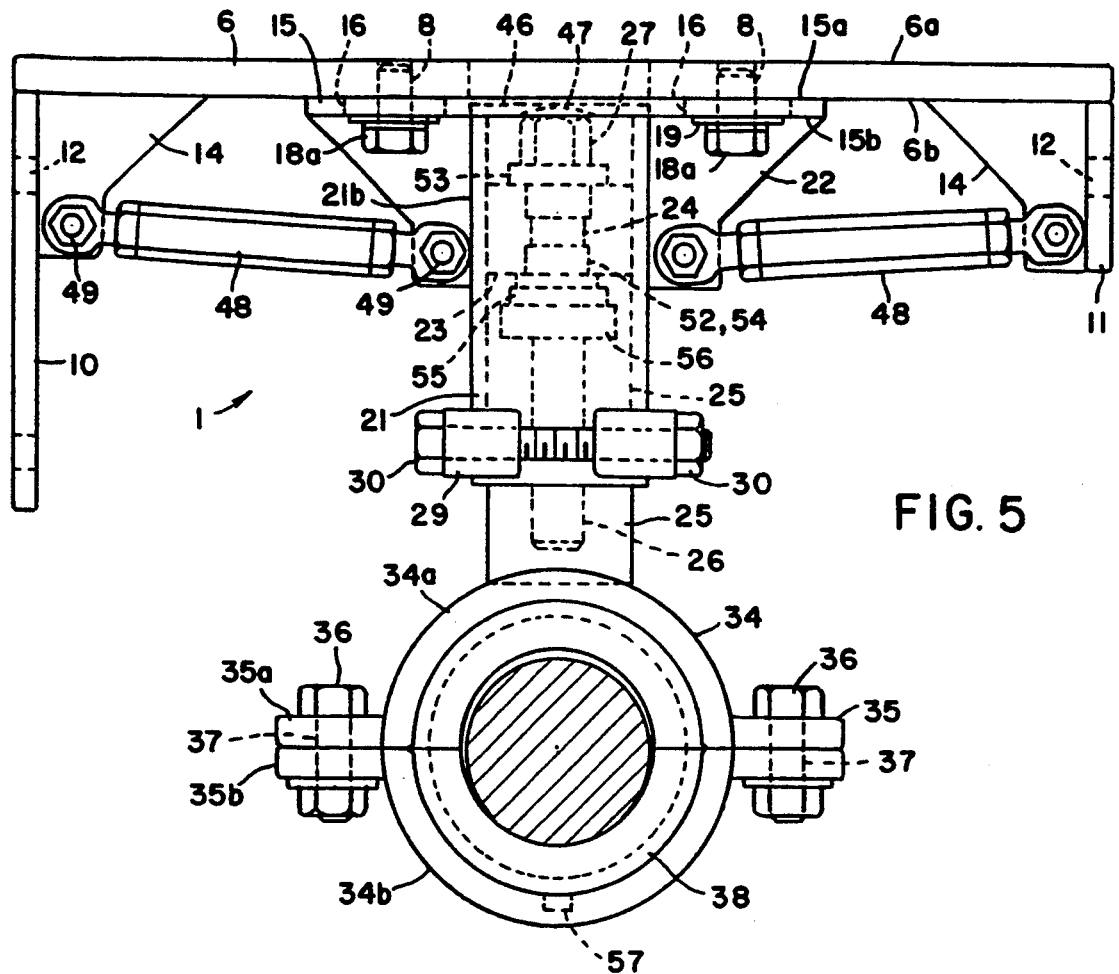
FIG. 5 is a top view of a second embodiment of the adjustable bearing support assembly of the present invention.
Figure 6:
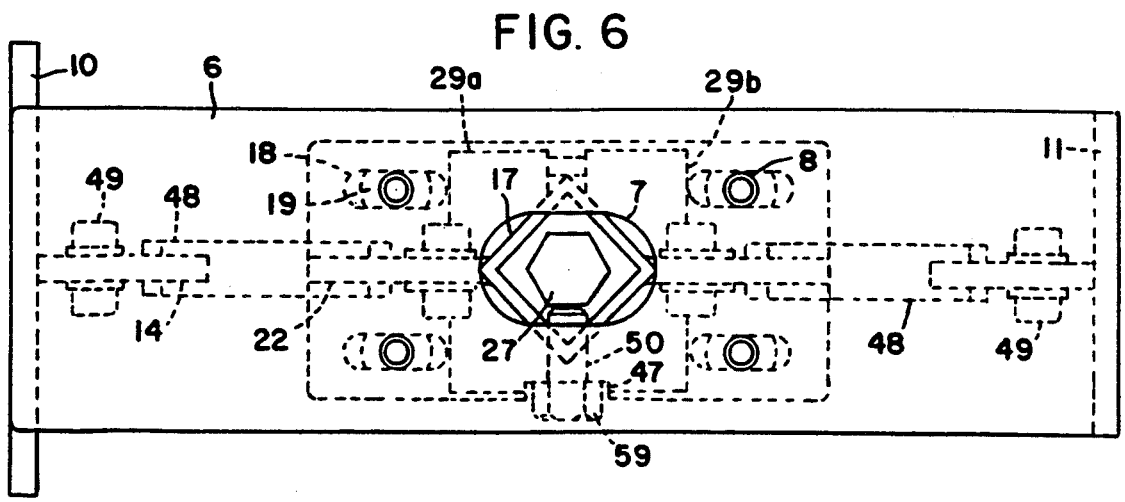
FIG. 6 is a side elevation view, partly in section, of the embodiment shown in FIG. 5.

As shown in FIGS. 5 and 6 tubular support column 21 in the second embodiment is preferably square and one end of said square tubular support column 21 fits within said diamond-shaped countersunk portion 46 of said column mounting plate 15, where said column 21 is affixed thereto, preferably by welding. Said inner gussets 22 preferably bracket said tubular support column 21, and are welded to exterior surface 21b of said support column 21 as well as the lower surface 15b of said column mounting plate 15. More preferably, said inner gussets 22 are welded along two external edges or line vertices 21c of the square tubular support column 21, as shown in FIGS. 8A and 8B. Said inner gussets 22 are preferably the same size and configuration as said outer gussets 14, and are connected therewith by a pair of turnbuckles 48 engaging said inner 22 and outer 14 gussets at gusset holes 49 at the base of each gusset. Said turnbuckles 48 may be tightened or extended to provide additional brace support for said tubular support column 21. Since said inner gussets 22 are preferably mounted to said column mounting plate 15 and are thus offset vertically from said outer gussets 14, said turnbuckles 48 attached at said gusset holes 49 tilt downwards towards said tubular support column 21.

As shown in FIGS. 8A and 8B, a cylindrical projection 50 is affixed, preferably by welding, to said square tubular support member 21 along one of said exterior line vertices 21c at said one end. A threaded hole 51 preferably passes through said cylindrical projection 50 and the hole 51 continues through said tubular support column 21 to the interior of said support column 21. As in the first embodiment, screw adjusting block 23 preferably slidably fits within the interior portion of said support column 21, preferably at said one end. Block 23 in the second embodiment is preferably square, preferably situated within said square tubular support column 21 below said threaded hole 51, and preferably welded to the portion of said interior surface 21a of column 21 in contact with said block 23. Said threaded hole 24 in screw adjusting block 23 in this embodiment is also preferably centered along the central axis formed by said square support column 21, and preferably has countersunk portions 52 on both ends of said threaded hole 24.

As in the previous embodiment, support post 25 slidably engages interior surface 21a of said support column 21, preferably below said screw adjusting block 23. However, support post 25 is preferably square in this second embodiment. As with threaded hole 24, threaded hole 26 of said support pest 25 is likewise centered along the central axis of said square support column 21 and faces said block 23. As in the previous embodiment, vertical adjustment bolt 27 preferably engages the thread of hole 26 of said support post 25. The head portion of said bolt 27 in both embodiments preferably has a hexagonal shape for simple tool engagement, and in the second embodiment is preferably separated from a first end of said screw adjusting block 23 by a first washer 53. Said adjustment bolt 27 preferably also engages a pair of flange bushings 54 which is shown in FIG. 5 in a close press fit within the countersunk portions 52 of said threaded hole 24. At a second and opposite end of said screw adjusting block 23, adjustment bolt 27 preferably engages a second washer 55 and a split threaded collar 56.

The opposite end of said support post 25 is, as in the first embodiment, attached to said bearing insert clamp 34, preferably by welding, where said opposite end may be curved to facilitate welding. Bearing insert clamp 34 in this embodiment also includes top half 34a and bottom half 34b held together by said plurality of clamp bolts 36 through said corresponding clamp holes 37 in said two pairs of upper 35a and lower 35b bearing insert clamp flanges 35, welded on either side of said clamp 34, as described above and as shown in FIG. 5. The bearing 38 is enclosed between the top 34a and bottom 34b halves of said bearing insert clamp 34, and as in the first embodiment, the material used by one skilled in the art depends upon the specific application. As before, the selected material is a function of the shaft material and the product conveyed. Melamine is an example of one preferred material. Bearing insert clamp 34 may also include a plurality of bearing insert slots 57 for fixedly securing said bearing 38 within the split bearing insert clamp 34.

As with the first embodiment, support post 25 is also secured in place within said square tubular support column 21 by means of a square split column clamp 29 affixed to exterior surface 21b of column 21. The two halves 29a and 29b of said square split column clamp 29 are secured around said tubular support column 21 by a pair of split column bolts 30 on either side of column 21. Tightening said square split column bolts 30 draws the two split column clamp halves 29a and 29b together, compressing said tubular support column 21 against said support post 25, which already forms a tight fit within said tubular support column 21, thereby securing said support post 25 in place and preventing movement and rotation of said support post 25 within said tubular support column 21. Preferably, an internal groove 58 along an internal vertex 21c at said opposite end of said tubular support column 21 assists in tightening said support post 25 within said support column 21, which eliminates clearance between these two parts, thereby preventing movement of said support post 25 within column 21 and subsequent wear damage.

A locking screw 59 is threaded through said threaded hole 51 of said cylindrical projection 50, where said locking screw 59 has sufficient length for the driven end thereof to abut one of the hexagonal faces of the head portion of said vertical adjustment bolt 27. Thus, tightening said locking screw 59 against said hexagonal face of said adjustment bolt 27 locks said adjustment bolt 27 in place, preventing further rotational movement of the bolt 27 and thus vertical movement of the assembly 1. Arcuate groove 47 along said one end of said lower surface 15b of said column mounting plate 15 facilitates the free rotation of the head portion of said locking screw 59 while threading into said threaded hole 51 of said cylindrical projection 50. Preferably, arcuate groove 47 provides sufficient room around the head portion of said locking screw 59 for tool engagement of said screw head.

As with the previous embodiment, a primary advantage of the present invention is providing simple and non-dismantling adjustments along the X, Y and Z axes of the bearing support assembly 1, as shown in FIG. 1, to align said auger sections 2 within said trough 4.

Vertical or Z-axis adjustment to the height of said auger section 2 is again accomplished through vertical adjustment bolt 27. As described above and shown in FIGS. 5 and 6, oval-shaped opening 7 of said top support plate 6 and diamond-shaped opening 17 of said column mounting plate 15 are preferably initially centered around said vertical adjustment bolt 27, thereby providing external access to the partially recessed bolt 27 within the openings, such as by a socket wrench.

To allow free rotation of said vertical adjustment bolt 27, however, locking screw 59, which engages a hexagonal head surface of said bolt 27, must be partially withdrawn or removed, freeing bolt 27 to rotate. When said locking screw 59 is pulled back and the split column clamp bolts 30 at the opposite end of said tubular support column 21 are loosened, rotation of said vertical adjustment bolt 27 in threaded engagement with said threaded hole 26 raises or lowers said support post 25 within said tubular support column 21. Since the opposite end of said support post 25 is attached to said bearing insert clamp 34 and bearing 38, rotational movement of said vertical adjustment bolt 27 moves said auger section 2 or drive shaft therein, allowing vertical (or Z-axis) adjustment of said auger section 2 within trough 4 along the Z-axis shown in FIG. 1, the first of the three axes. Upon completion of the vertical adjustment, said locking screw 59 is preferably tightened, re-engaging the same or another hexagonal face of said adjustment bolt 27, and said split column bolts 30 in said split column clamps 29 are also tightened, further securing the position of said support post 25 within said square tubular support column 21.

Longitudinal (or X-axis) adjustment of said bearing support assembly 1 and said auger section 2 within said trough 4 is done by loosening said threaded plate bolts 18 within the column plate slots 16 of said column mounting plate 15, and slidably and longitudinally repositioning said bottom plate 15 relative to said top support plate 6. Turnbuckles 48 connecting gussets 14 and 22 on either side of said tubular support column 21 also need adjustment. Since said tubular support column 21 fits within said countersunken portion 46 of said column mounting plate 15, slidable adjustment of said column mounting plate 15 also results in longitudinally slidable adjustment of said tubular support column 21, support post 25, bearing insert clamp 34, bearing 38 and said auger screw 2 within said trough 4 along the X-axis shown in FIG. 1, the second of the three axes. After longitudinally repositioning said column mounting plate 15 relative to said top support plate 6, the plate bolts 18 are retightened, maintaining the longitudinally adjusted position of said plate 15 and auger screw 2. Preferably, oval-shaped hole 7 in said top support plate 6 has a sufficient longitudinal length or major axis diameter to both allow maximum repositioning said top 6 and bottom 16 plates along said slots 16 and still maintain sufficient external access to said vertical adjustment bolt 27 for adjustment.

A third or Y-axis adjustment of said bearing support assembly 1 within said trough 4 is done by loosening said anchoring bolts 13 securing said left 10 and right 11 mounting plates to external supports (not shown), and slidably repositioning said bearing support assembly 1 relative to said trough 4 along the direction of said mounting plate slots 12, which is the third direction. When said support assembly 1 has been so repositioned, the anchoring bolts 13 (shown in FIG. 1) are retightened, allowing adjustment and alignment of said bearing support assembly 1 and said auger screw 2, along the Y-axis shown in FIG. 1, the last of the three axes.

It should be understood that oval-shaped opening 7 and circular or diamond-shaped opening 17 may have alternate shapes so long as the two openings provide sufficient access to said adjustment bolt 27 and allow adjustments to said bolt 27 without dismantling all or part of the bearing support assembly 1. Initially, both openings are preferably aligned with each other, thereby providing both left and right longitudinal (X-axis) access to and adjustment of said bolt 27. Initially, anchor bolts 13 and plate bolts 18 are also preferably centrally aligned within the mounting plate slots 12 and column plate slots 16, respectively, to allow positional adjustments of said bearing support assembly 1 along either side of the slots.

Preferably, all bolts used in the present invention are hexagonal headed to provide a sufficient tool engagement surface. It should nonetheless be understood that alternate head shapes providing a sufficient tool engagement surface may be employed. In particular, vertical adjustment bolt 27 is preferably a hex bolt where locking screw 59 abuts one of the six faces to lock said bolt 27 in a vertical position. Preferably, adjustment bolt 27 has two different threads along its shaft portion: a right-handed thread at the head end of said shaft which contacts said threaded hole 24 of said screw adjusting block 23, and a left-handed thread along all or a portion of the remaining shaft which contacts said threaded hole 26 of said support post 25.

All bearing support assembly 1 materials, except the bearing 38, are made of corrosion resistant metal, preferably stainless steel. Nonetheless, it should be understood that the materials used by one skilled in the art will depend upon the specific application. All welds are preferably fillet welds. Preferably, screw adjusting block 23 is precision fitted within tubular support column 21. Also, said tubular support column 21 and said support post 25 may each include a plurality of holes and corresponding plugs 60 for various purposes, including lubrication of the internal flange bushings 54 and positioning adjustment of said split threaded collar 56. Anti-rotation blocks 20 on said support plate 6 preferably have a clearance of under 1/32 inch with said clamp washers 19.

Although preferred embodiments of the present invention have been described and illustrated, it will be apparent to those skilled in the art that various modifications may be made without departing from the principles of the invention.

What is claimed is:

1. A bearing support assembly comprising:
    a support plate having an upper and a lower surface, and having a support opening;
    a column mounting plate having a plurality of column anchoring slots and a column opening, said column mounting plate in slidable engagement with either the upper surface or the lower surface of the support plate in the direction of the plurality of column anchoring slots;
    a tubular support column fastened at one end to the column mounting plate at the column opening; wherein said tubular support column extends through the support opening of the support plate when said column mounting plate is in slidable engagement with the upper surface of the support plate;
    a support post slidably engaged within the tubular support column;
    vertical adjustment means fastened at one end to a first end of the support post;
    a first mounting plate having a plurality of mounting plate anchoring slots, said mounting plate affixed substantially perpendicularly to the support plate and movable in the direction of the plurality of mounting plate anchoring slots; and
    bearing clamp means fastened to a second end of the support post.

2. The bearing support assembly of claim 1 wherein said column mounting plate is in slidable engagement with the upper surface of the support plate.

3. The bearing support assembly of claim 2, wherein the support opening is slotted.

4. The bearing support assembly of claim 2, wherein the support opening is substantially oval-shaped.

5. The bearing support assembly of claim 2, wherein the tubular support column and the column opening are substantially circular and are substantially the same diameter.

6. The bearing support assembly of claim 2, wherein the tubular support column and the column opening are substantially square and are substantially the same size.

7. The bearing support assembly of claim 2, further comprising a screw adjusting block in fixed engagement within the tubular support column, said screw adjusting block supporting the vertical adjustment means at a second end.

8. The bearing support assembly of claim 2,
    wherein the support post has a threaded hole at the first end; and
    wherein the vertical adjustment means comprises an adjustment bolt having a threaded shaft portion at said one and engaging said threaded hole.

9. The bearing support assembly of claim 2, further comprising a column clamp affixed to the tubular support column at a second end.

10. The bearing support assembly of claim 2, wherein the bearing clamp means comprises a split bearing clamp having a top and a bottom portion, said top portion of the split bearing clamp fastened to the second end of the support post.

11. The bearing support assembly of claim 10, wherein the split bearing clamp further includes a plurality of flange members.

12. The bearing support assembly of claim 2, further comprising a plurality of washers covering the plurality of column anchoring slots.

13. The bearing support assembly of claim 12, further comprising a plurality of anti-rotation blocks fastened to the support plate and adjacent the washers.

14. The bearing support assembly of claim 2, further comprising a second mounting plate having a plurality of mounting plate anchoring slots, said second mounting plate affixed substantially perpendicularly to the support plate and opposite the first mounting plate, and movable in the direction of the plurality of mounting plate anchoring slots.

15. The bearing support assembly of claim 2, further comprising a plurality of column plate block assemblies for securing the column plate, each of the assemblies comprising:
    an adjustment block fastened to the support plate and having a threaded hole;
    an adjustment bolt in threaded engagement with the threaded hole of said adjustment block; and
    an abutment block having a first surface engaging a first end of the adjustment bolt, and a second surface for abutting engagement with the column plate.

16. The bearing support assembly of claim 1 wherein said column mounting plate is in slidable engagement with the lower surface of the support plate.

17. The bearing support assembly of claim 16, wherein the support opening is slotted.

18. The bearing support assembly of claim 16, wherein the support opening is substantially oval-shaped.

19. The bearing support assembly of claim 16, wherein the tubular support column and the column opening are substantially circular and are substantially the same diameter.

20. The bearing support assembly of claim 16, wherein the tubular support column and the column opening are substantially square and are substantially the same size.

21. The bearing support assembly of claim 16, further comprising a screw adjusting block in fixed engagement within the tubular support column, said screw adjusting block supporting the vertical adjustment means at a second end.

22. The bearing support assembly of claim 16,
    wherein the support post has a threaded hole at the first end; and wherein the vertical adjustment means comprises an adjustment bolt having a threaded portion at said one end engaging the threaded hole.

23. The bearing support assembly of claim 16, further comprising a column clamp affixed to the tubular support column at a second end.

24. The bearing support assembly of claim 16, wherein the bearing clamp means comprises a split bearing clamp having a top and a bottom portion, said top portion of the split bearing clamp fastened to the second end of the support post.

25. The bearing support assembly of claim 24, wherein the split bearing clamp further includes a plurality of flange members.

26. The bearing support assembly of claim 16, further comprising a plurality of washers covering the plurality of column anchoring slots.

27. The bearing support assembly of claim 26, further comprising a plurality of anti-rotation blocks fastened to the support plate and adjacent the washers.

28. The bearing support assembly of claim 16, further comprising a second mounting plate having a plurality of mounting plate anchoring slots, said second mounting plate affixed substantially perpendicularly to the support plate and opposite the first mounting plate, and movable in the direction of the plurality of mounting plate anchoring slots.

29. The bearing support assembly of claim 16, further comprising:
a projection fastened at said one end of the tubular support column, said projection having a threaded hole; and
a locking screw in threaded engagement with the threaded hole of the projection, the driving end of the locking screw in abutting engagement with the vertical adjustment means.

30. The bearing support assembly of claim 29, wherein the projection is cylindrical.

31. A bearing support assembly comprising:
a support plate having an upper and a lower surface, and having a support opening;
a column mounting plate having a plurality of column anchoring slots and a column opening, said column mounting plate in slidable engagement with the upper surface of the support plate in the direction of the plurality of column anchoring slots;
a tubular support column fastened at one end to the column mounting plate at the column opening and extending through the support opening of the support plate;
a support post having a threaded hole at a first end, said support post in slidable engagement within the tubular support column;
an adjustment bolt having a threaded portion engaging the threaded hole at the first end of the support post;
a mounting plate having a plurality of mounting plate anchoring slots, said mounting plate fastened substantially perpendicularly to the support plate and movable in the direction of the plurality of mounting plate anchoring slots; and
a bearing clamp fastened to a second end of the support post.

* * * * *